United States Patent [19]

Katoh et al.

[11] Patent Number: 4,953,031

[45] Date of Patent: Aug. 28, 1990

[54] ELECTRONIC BLACKBOARD HAVING IMAGE DISPLAY AND PRINT FUNCTIONS

[75] Inventors: Naoya Katoh, Kanagawa; Koichiro Kakinuma, Tokyo; Tohru Naganuma, Tokyo; Makoto Ando, Tokyo; Osamu Majima, Tokyo, all of Japan

[73] Assignee: Sony Corporation, Tokyo, Japan

[21] Appl. No.: 447,078

[22] Filed: Dec. 7, 1989

[30] Foreign Application Priority Data

Dec. 8, 1988 [JP] Japan ................................ 63-310669
Jul. 29, 1989 [JP] Japan ................................ 1-197797

[51] Int. Cl.[5] ........................ H04N 1/29; G01D 15/06

[52] U.S. Cl. ................................ 358/300; 346/153.1; 355/271; 358/401; 358/496

[58] Field of Search ........................ 358/300, 496, 401; 346/153.1, 155, 160.1; 355/202, 271, 274, 275, 288, 212

[56] References Cited

U.S. PATENT DOCUMENTS 4,547,787 10/1985 Kaneko ........................... 346/153.1
4,713,698 12/1987 Takahashi ........................ 346/153.1

*Primary Examiner*—Bruce A. Reynolds
*Assistant Examiner*—Scott A. Rogers
*Attorney, Agent, or Firm*—Lewis H. Eslinger; Jay H. Maioli

[57] ABSTRACT

An electrostatic blackboard having an image display function for displaying on an electrostatically recordable blackboard display a visible toner image converted from an electrostatic latent image formed on the backboard by an electrostatic recording head includes copying apparatus for transfering the visible image on the blackboard to a large-size paper sheet. A semi-permanent latent image toner fusing operation is provided to create a semi-permanent visible image, yet permit easy erasing.

7 Claims, 8 Drawing Sheets

ELECTRONIC BLACKBOARD HAVING IMAGE DISPLAY AND PRINT FUNCTIONS

BACKGROUND OF THE INVENTION

1. Field of the Invention

This invention relates generally to an electronic blackboard in which an electrostatic latent image is formed on a blackboard display member by an electrostatic recording head and, more particularly, to a system in which the latent image is electrostatically recorded and converted into a visible image by means of toner.

2. Description of the Background

There was previously proposed in U.S. Patent Application Ser. No. 07/201,167, filed June 2, 1988, now U.S. Pat. No. 4,908,711 issued Mar. 13, 1990, an electronic blackboard having a copy function to create a hard copy of characters that are handwritten onto a blackboard sheet and having a display function to read copy information and to display it on the blackboard sheet.

In such electronic blackboards having the display function, as shown in FIG. 1, an electronic recording medium 1 in the form of an endless sheet is arranged to be transported by a feed motor 2 and a drive roller 3.

As shown in FIG. 2, the electronic recording medium 1 includes a substrate 1*a* composed of a sheet of polyethylene terephthalate having a thickness of 100 microns. An electrically conductive layer 1*c* having a thickness of about 50 microns is composed of a polymer such as polyurethane, and adheres to the substrate 1*a* by means of an adhesive layer 1*b* having a thickness of about 10 microns. The polymer constituting the electrically conductive layer 1*c* contains titanium dioxide or indium oxide, is white in color, and may be derived from a mixture of diisocyanate and polyethylene glycol.

A dielectric layer 1*e* having a thickness of about 25 microns and made of transparent polyvinylidene fluoride adheres to the conductive layer 1*c* by means of an adhesive layer 1*d* having a thickness of about 10 microns. An ultraviolet light ray absorber is contained in the adhesive layer 1*d*. It is noted that polyvinylidene fluoride is a substance that generally cannot be adherent by means of regular adhesives, so a special pressure-sensitive adhesive is used.

Further, a hard coat layer 1*f* is applied to the surface of the dielectric layer 1*e*, and the surface of the hard coat layer 1*f* may be used as a write surface W for the electrostatic recording medium 1. A commercial product known as "Tough Top" marketed by the Toray Corporation and made of a resin of a polysiloxane type can be used for the hard coat 1*f*. Consequently, damage to the write surface W can be prevented and letters or the like written on the write surface can be easily erased.

A recording head 6 composed of a write electrode, a stylus electrode portion 4, and a control electrode portion 5, an AC charge remover 7, a cleaning blade 8, a charge coupled device (CCD) line sensor 10, a lens system 9, and a mirror 11 are all arranged in opposing relation to the endless electrostatic recording medium 1. A developer roller 12 is further provided for supplying toner.

The electronic blackboard assembly is encased by a cover (not shown) having a window or aperture in a front portion thereof, with the electrostatic recording medium 1 being exposed through the window. Provided in a lower portion of the front portion of the cover is an original document insertion slot 14*a*, a copy ejection slot 14*b*, and an outlet slot 15 for printed paper. Although not shown, the cover is supported on rollers so that the electronic blackboard is easily transportable.

In normal use of this electronic blackboard, information may be written on the write surface W of the electrostatic recording medium 1 with, for example, a felt pen or the like. When it is desired to copy the written information, the exposed portion of the electrostatic recording medium I is driven to a rear portion of the blackboard so that information written thereon can be read by the CCD line sensor 10 through the mirror 11 and the lens system 9. The visual information is converted into electrical signals by the CCD line sensor 10 and copied onto recording paper by, for example, xerography or a similar process, and the printed copy is discharged from the printed paper outlet slot 15. When it is desired to electrostatically display the image of an existing document on the electronic blackboard, the document is inserted through the document insertion slot 14*a*, and an electrostatic latent image is formed on the write surface W of the electrostatic recording medium 1 by the recording head 6. The latent image is developed by the toner supplied from the developer roller 12, and adheres to the electrostatic latent image on the write surface W as it passes the developer roller 12, resulting in a visible image (toner image). As the recording medium 1 travels past the rear portion of the blackboard, toner and ink marks written on the recording medium 1 with the felt pen are scraped away by the cleaning or doctor blade 8, and any charges or electrification on the write surface W of the recording medium 1 are removed by the AC charge remover 7.

While providing an operable system, such a conventional device as mentioned above, nevertheless, has various defects such as the following. (1) Since the toner merely electrostatically adheres onto the electrostatic recording medium 1, toner drop may occur, causing clothing and the surrounding area to be contaminated therewith. (2) Toner particles may be scattered by cooling fans, air conditioning, and breezes, thereby further contaminating the environment. (3) With a standard printer associated therewith, the size of the copy paper may be limited, so that the size of the hard copy image may have to be reduced.

OBJECTS AND SUMMARY OF THE INVENTION

Accordingly, it is an object of the present invention to provide an improved electronic blackboard that can eliminate the above-noted defects encountered with the prior art.

More specifically, it is an object of the present invention to provide an electronic blackboard in which toner adhered to a display surface of the blackboard to form an image will not drop off the display surface, and by which it is possible to obtain a hard copy equal in size to the image formed on the blackboard.

According to an aspect of the present invention, there is provided a display apparatus comprising: a frame, sheet guides supported by the frame, and a flexible sheet supported for movement by the sheet guides. The image is provided by a recording head arranged to contact a surface of the flexible sheet for generating a static latent image, a developing device for rendering visible the latent image formed on the flexible sheet by the recording head, and a fusing device provided for semi-fusing toner that forms the visible latent image on the flexible sheet.

According to another aspect of the present invention, there is provided a display apparatus comprising a frame, sheet guides supported by the frame, a flexible sheet supported for movement by the sheet guides, a recording head arranged to contact a surface of the flexible sheet, and a signal processor to generate a normal image signal and a mirror image signal to be selectively supplied to the recording head. A developing device is provided for generating a visible image by supplying toner to a latent image formed on the flexible sheet by the recording head, and a contact printing device prints a normal image onto a paper from a mirror image formed on the flexible sheet by toner by contacting the paper directly to the flexible sheet when the signal processor supplies a mirror image signal to the head.

The above and other objects, features, and advantages, of the present invention will be apparent in the following detailed description of the preferred embodiments when read in conjunction with the accompanying drawings, in which like reference numerals are used to identify the same or similar parts in the several views.

DETAILED DESCRIPTION OF PREFERRED EMBODIMENTS

The electronic blackboard according to an embodiment of the present invention will now be described in detail with reference to FIGS. 3 to 10.

Figure 1:
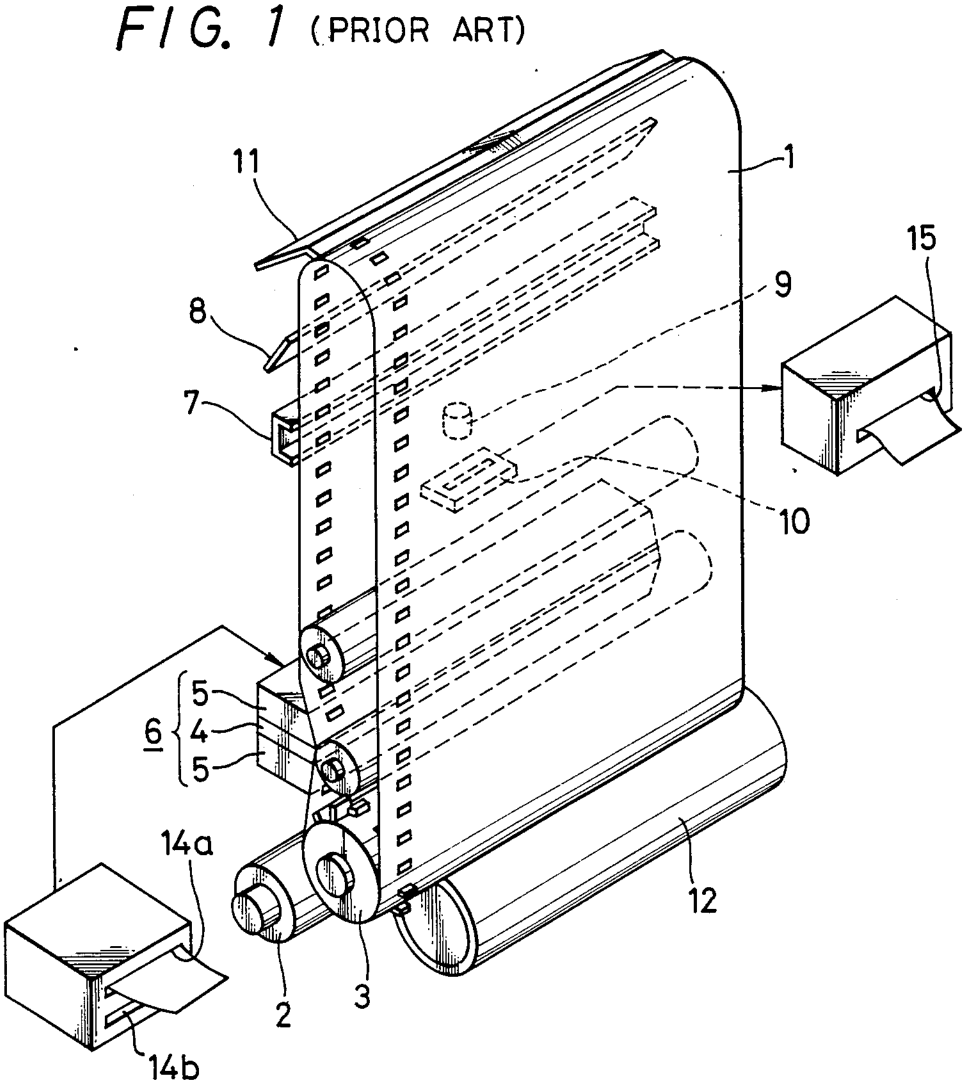
FIG. 1 (PRIOR ART)
FIG. 1 is a perspective view of an electrostatic blackboard according to the prior art.
Figure 2:
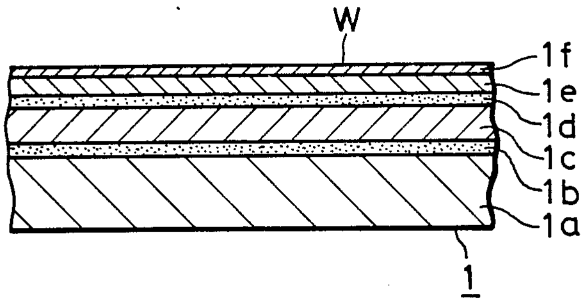
FIG. 2 is an enlarged cross section of a portion of a blackboard display member used in the prior art electrostatic blackboard shown in FIG. 1.
Figure 3:
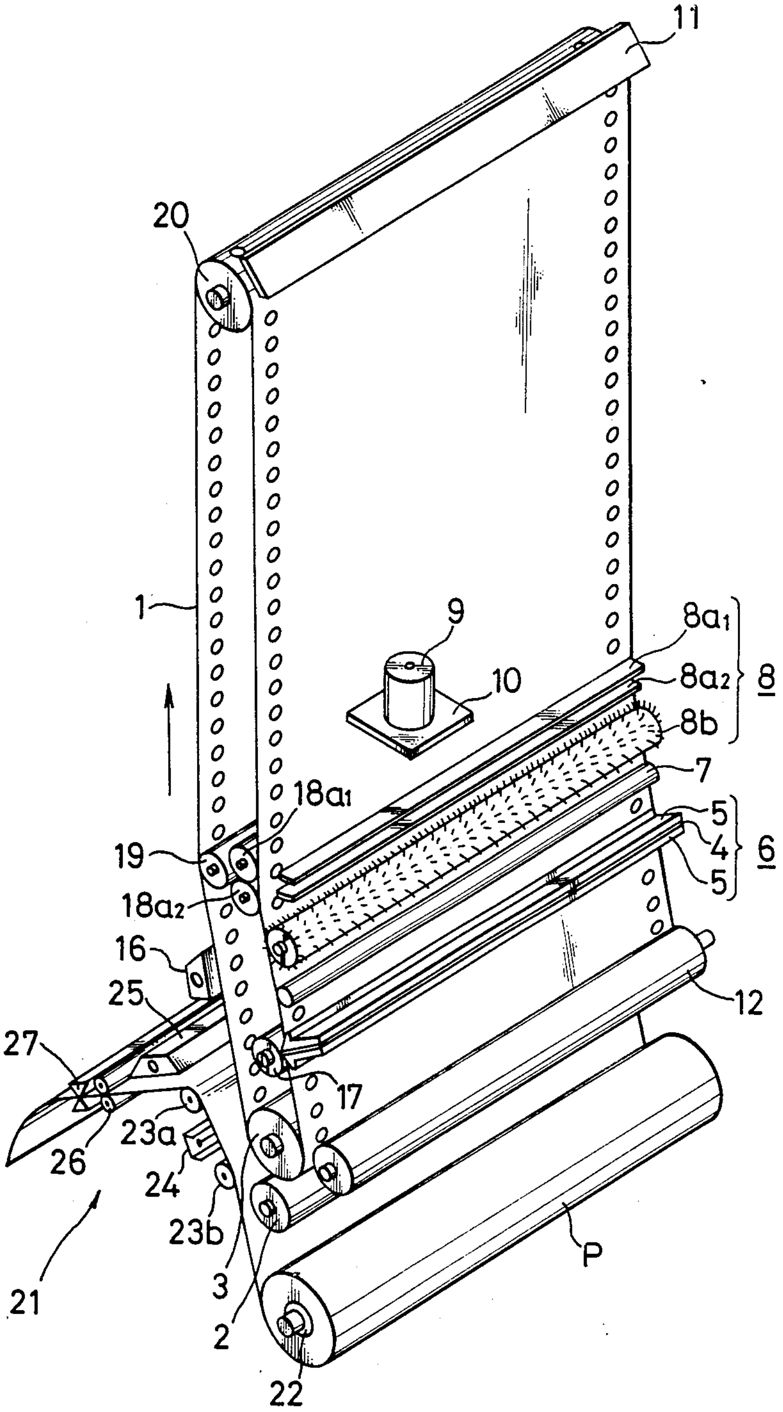
FIG. 3 is a perspective view of an embodiment of the present invention.

In FIG. 3, which shows an embodiment of the present invention, like parts co responding to those of the prior art blackboard shown in FIG. 1 are marked with the same reference numerals, and therefore need not be described in detail.

In FIG. 3, an endless electrostatic recording medium 1 is arranged as a blackboard display member, which is driven by a drive motor 2 and a drive roller 3. An electrostatic recording head 6 composed of a multi-stylus electrode portion 4 surrounded by two control electrode portions 5, an AC charge removing roller 7, a cleaning assembly 8 composed of cleaning blades $8a_1$ and $8a_2$ and a cleaning roller brush **8*b*, a CCD line sensor 10 including a lens system 9 and a mirror 11 are all arranged in opposing relation to the electrostatic recording medium 1. A developer roller 12** is further provided for supplying toner from a toner compartment (not shown).

A laterally extending flash lamp 16 is provided downstream of the developer roller 12 as a heating unit for fixing the image onto the recording medium 1. The flash lamp 16 has a length sufficient to extend over the full width of the electrostatic recording medium 1. A pressure roller 17 made of resilient material is arranged on the side of the recording medium that is opposite the electrostatic recording head 6 to place the recording medium in pressure contact with the head 6, and guide rollers $18a_1$ and $18a_2$ are arranged to press the recording medium 1 against the cleaning blades $8a_1$ and $8a_2$. Further, guide rollers 19 and 20 are provided to guide the recording medium 1 for stable movement.

A toner image of copy information is formed on a display surface of the electrostatic recording medium 1 in the same way as mentioned with respect to the conventional device shown in FIG. 1.

In this embodiment, an image transfer mechanism 21, which may utilize a transfer corotron, for example, is provided so that an image that is developed on the electrostatic recording medium 1 can be transferred to standard paper, thereby to preserve the image on a hard copy. Generally, a transfer corotron generates corona ions behind a paper to be printed and the charged toners on the writing surface are removed therefrom and attracted to the front side of the paper by the charge forces.

The image transfer mechanism 21 comprises a bobbin 22 for holding a roll of paper P, pressure rollers **23*a* and 23*b* for pressing the paper P from the bobbin 22 against a developed surface pressing the paper P from the bobbin 22 against a developed surface of the electrostatic recording medium 1, the developer roller 12, a transfer corotron 24 located opposite the pressed portion of the paper P, a fixing flash lamp 25, paper feeding roller assembly 26, and a paper cutter 27**.

In the transfer mechanism 21, the roll paper P fed by the feeding rollers 26 from the bobbin 22 is pressed against the developed surface of the electrostatic recording medium 1 of the blackboard by the pressure rollers **23*a* and 23*b*. The transfer corotron 24, disposed immediately downstream of the pressure roller 23*b*, generates a charge behind the paper P, causing the charged toner image developed on the recording medium 1** to transfer onto the paper P.

After the toner image is transferred onto the paper P, it is permanently fixed onto the paper P with heat from the fixing flash lamp 25. The paper P having the toner image transferred thereon is driven by the feeding roller assembly 26 and cut by the paper cutter 27 at a predetermined location, resulting in a hard copy of the image having a size corresponding to the size of the image that was developed on the recording medium 1.

Figure 4:
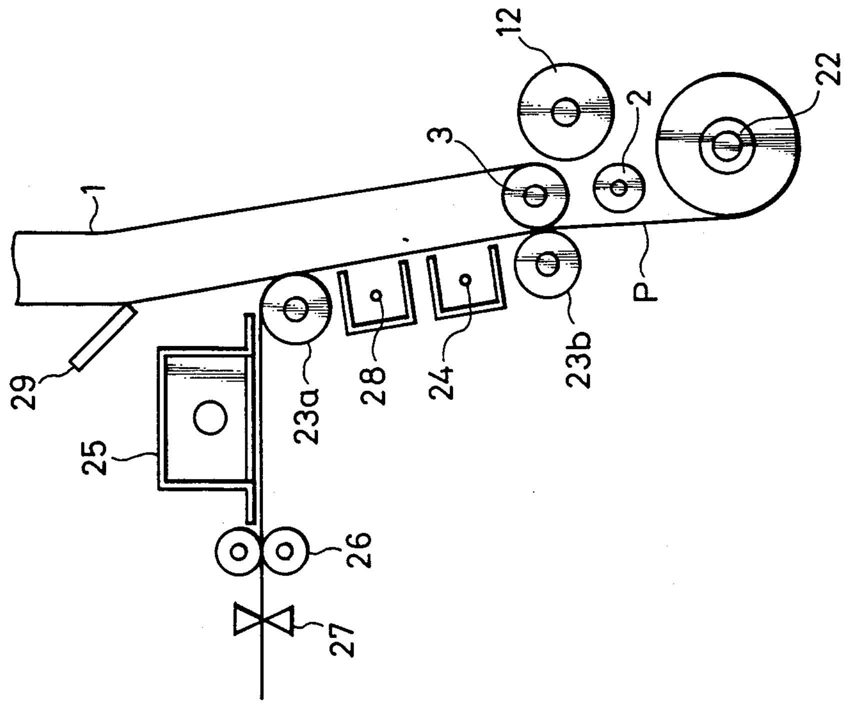
FIG. 4 is a representation of a portion of an electrostatic blackboard according to another embodiment of the present invention.

FIG. 4 shows another embodiment of the transfer mechanism 21. In this embodiment, a so-called peeling corotron 28 is provided downstream of the transfer corotron 24 in the region in which the paper P is still in intimate contact with the recording medium 1, but between the two pressure rollers 23*a* and 23*b*. In this embodiment, the toner image is transfered by the transfer corotron 1 to the paper P, and it has been found that a good transfer is achieved when the distance between a wire of the transfer corotron 24 and the developed surface portion of the recording medium 1 is 10 mm and the voltage applied to the transfer corotron 24 is +4 kV.

After the image transfer is complete, an AC voltage of 4 to 5 kV is applied to the peeling corotron 28 to weaken the adhesion between the paper P and the recording medium 1, and the toner transferred to the paper P is then fixed by heat generated from the fixing flash lamp 25.

Toner remains on the recording medium 1 even after the toner image is transferred to the paper P. Therefore, it is scraped off by the cleaning blade 29 before the recording medium is presented once again on the display surface.

Figure 5:
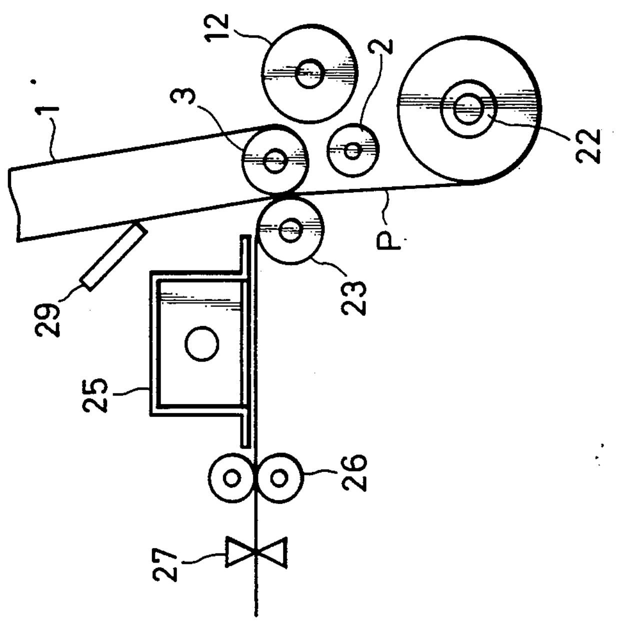
FIG. 5 is a representation of a portion of an electrostatic blackboard according to still another embodiment of the present invention.

FIG. 5 shows another embodiment of this transfer mechanism, in which without using any corotron a positive biasing voltage is applied to a single pressure roller 23, so that the toner image is transferred to the paper P while the paper P is being pressed to the recording medium 1 by the pressure roller 23. This embodiment can be constructed in a simpler manner than the preceding embodiment of FIG. 4.

In the above embodiments, the pressure rollers 23*a*, 23*b* and 23 are movably arranged relative to the electrostatic recording medium 1, so that these rollers 23*a*, 23*b* and 23 can be separated from the recording medium 1 to prevent intimate contact between the paper P and the recording medium when no image transfer is to be performed, thereby deferring to the inherent function of the blackboard, that is, to simply display an image on the display surface of the electrostatic recording medium 1.

To effect the image transfer to the paper P in the described embodiments, the electrostatic latent image is recorded from the original document onto the developing surface of the recording medium 1 in an inverted state with respect to the left and right or up and down directions, so that the toner image is developed as a mirror image.

Figure 6:
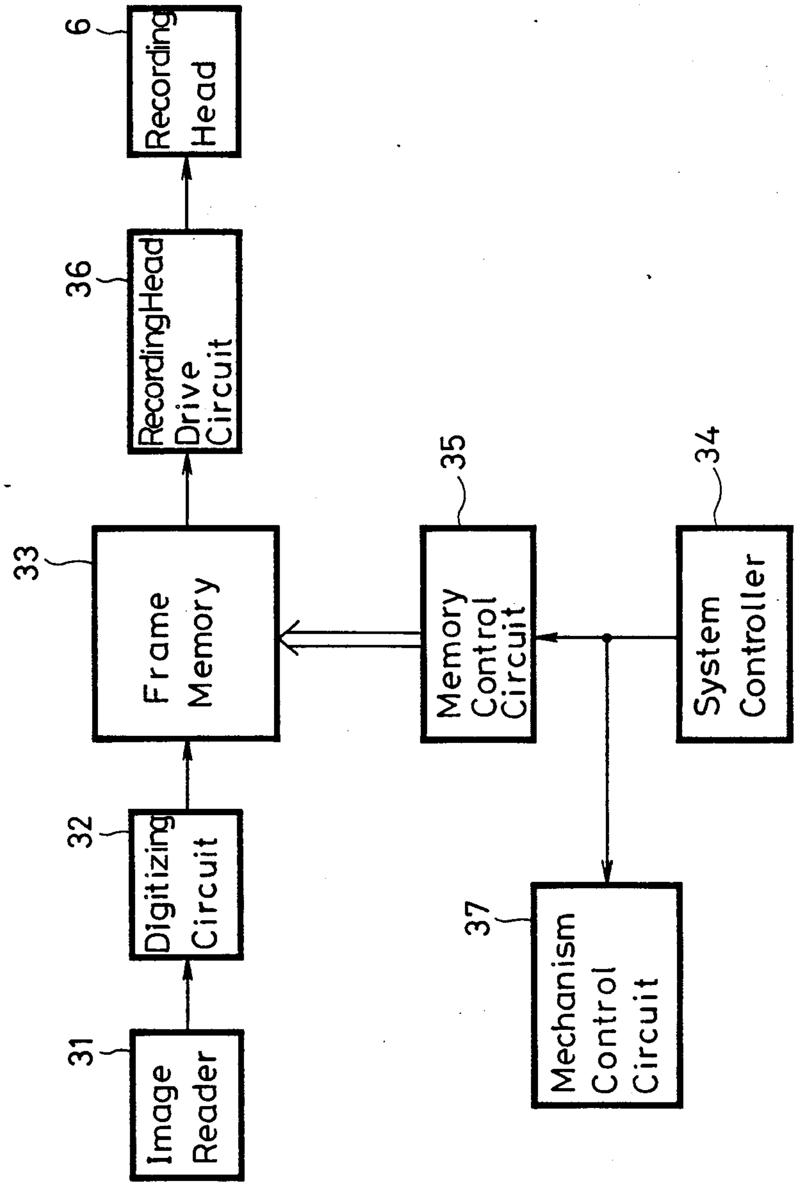
FIG. 6 is a circuit block diagram of a control circuit associated with the electronic blackboard shown in FIG. 3.

FIG. 6 is a circuit block diagram of an example of a control circuit for controlling the operation of the electronic blackboard described above. In FIG. 6, the control circuit comprises an image reader 31 for reading a copy, a digitizing circuit 32 for digitizing the image signal supplied from the image reader 31 as a readout of copy information, a frame memory 33 for storing the digital image signal, a system controller 34, a memory control circuit 35 controlled by the system controller 34, a recording head drive circuit 36 to control the recording head 6 and adapted to be supplied with the image signal from the frame memory 33 under control of the memory control circuit 35, and a mechanism control circuit 37 for driving the blackboard and controlled by the system controller 34. In other words, the analog image signal from the CCD is converted to a digital signal for storage in the frame memory 33. The frame memory 33 supplies the image signal stored therein to the recording head drive circuit 36 in a forward sequential order under control of the memory control circuit 35 when a normal display instruction is given by the system controller 34.

The recording head drive circuit 36 is connected to the respective stylus electrodes and the respective control electrodes of the recording head 6 to drive the latter by supplying drive signals to the respective electrodes of the head 6 according to the copy information supplied from the frame memory 33. The mechanism control circuit 37 for the blackboard is simultaneously actuated to drive the various mechanical portions of the blackboard other than the transfer mechanism 21, so that an electrostatic latent image can be recorded on the electrostatic recording medium 1 and the electronic blackboard can operate to display a toner image as described.

For the image transfer to the paper P, the system controller 34 is operated manually to switch the operation mode to the image transfer mode. Upon this switching, a signal from the memory control circuit 35 instructs the frame memory 33 to read the copy information stored therein in a reverse order and to supply the information to the recording head drive circuit 36. The recording head 6 responds to the drive signal from the recording head drive circuit 36 to form a reversed or mirror electrostatic latent image of the original copy image onto the electrostatic recording medium. Under this condition, the paper P is brought into intimate contact with the portion of the recording medium where the latent image is formed, and a toner image of the original information is transferred to the paper P.

A method of reversing the image or obtaining the mirror image in this transfer operation will be described with reference to the flow charts of FIGS. 7 and 9.

Figure 7:
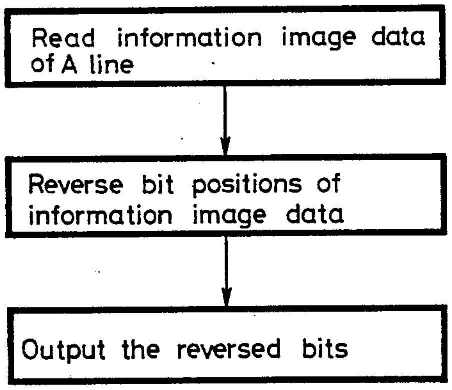
FIG. 7 is a flow chart useful in explaining operation of the control circuit shown in FIG. 6.

A first embodiment is shown in FIG. 7. In the embodiment of FIG. 7, respective lines of the information image data are read out and the bit positions of the information image data are reversed in the lateral direction. That is, assuming that one line includes 1600 bits, bit 0, bit 1, bit 2, . . . , bit 1599, the following replacement is performed:

| |
|---|
| bit 0 ←→ bit 1599 |
| bit 1 ←→ bit 1598 |
| bit 2 ←→ bit 1597 |
| . . |
| . . |
| bit 799 ←→ bit 800 |

Figure 8A:
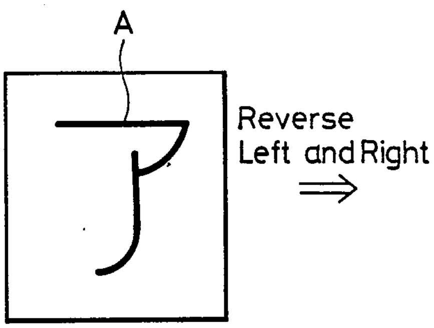
FIGS. 8A to 8C are schematic representations useful in explaining how an image is transferred according to an embodiment of the present invention.
Figure 8B:
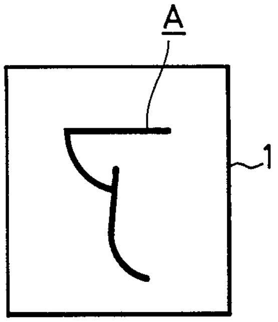
Figure 8C:
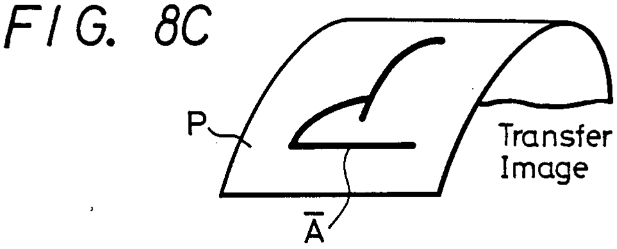

By outputting the replaced bits an information image A, as shown in FIG. 8A, is formed on the recording medium 1 as a horizontal mirror image $\underline{A}$, which is shown in FIG. 8B. A transfer image $\overline{A}$ is obtained on the paper P by transferring the mirror image A thereto, as shown in FIG. 8C.

Figure 9:
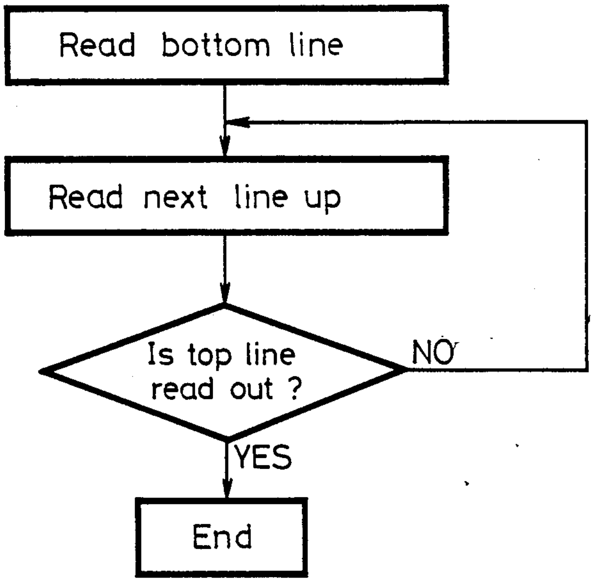
FIG. 9 is a flow chart useful in explaining another operation of the control circuit shown in FIG. 6.
Figure 10A:
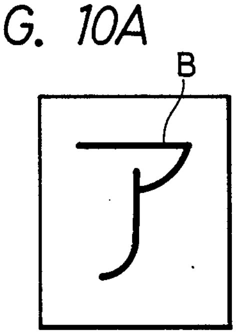
FIGS. 10A to 10C are schematic representations useful in explaining how an image is transferred according to another embodiment of the present invention.
Figure 10A:
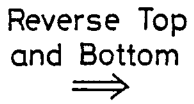
Figure 10B:
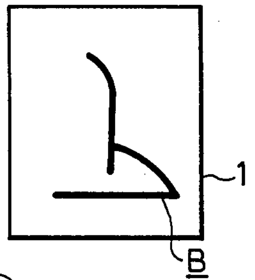
Figure 10C:
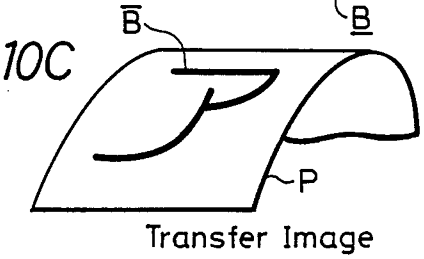

According to a second embodiment, shown in the flow chart of FIG. 9, the information data are sequentially read from the bottom line of information to the top line of information, and the data read from the memory 33 are outputted sequentially, resulting in a mirror image $\underline{B}$ of an information image B on the recording medium 1, which is transferred to the paper P as a transfer image $\overline{B}$ which is the same as the information image B, as shown in FIGS. 10A to 10C.

In order to obtain a hard copy of an image developed on the display surface of the electrostatic recording medium 1, the recording medium 1 is transported so that the image may be read by means of the CCD line sensor 10 disposed in the back side of the medium as in the case of the above-mentioned conventional system, so that the image is converted to an electrical signal and written on copy paper through the head.

Figure 11:
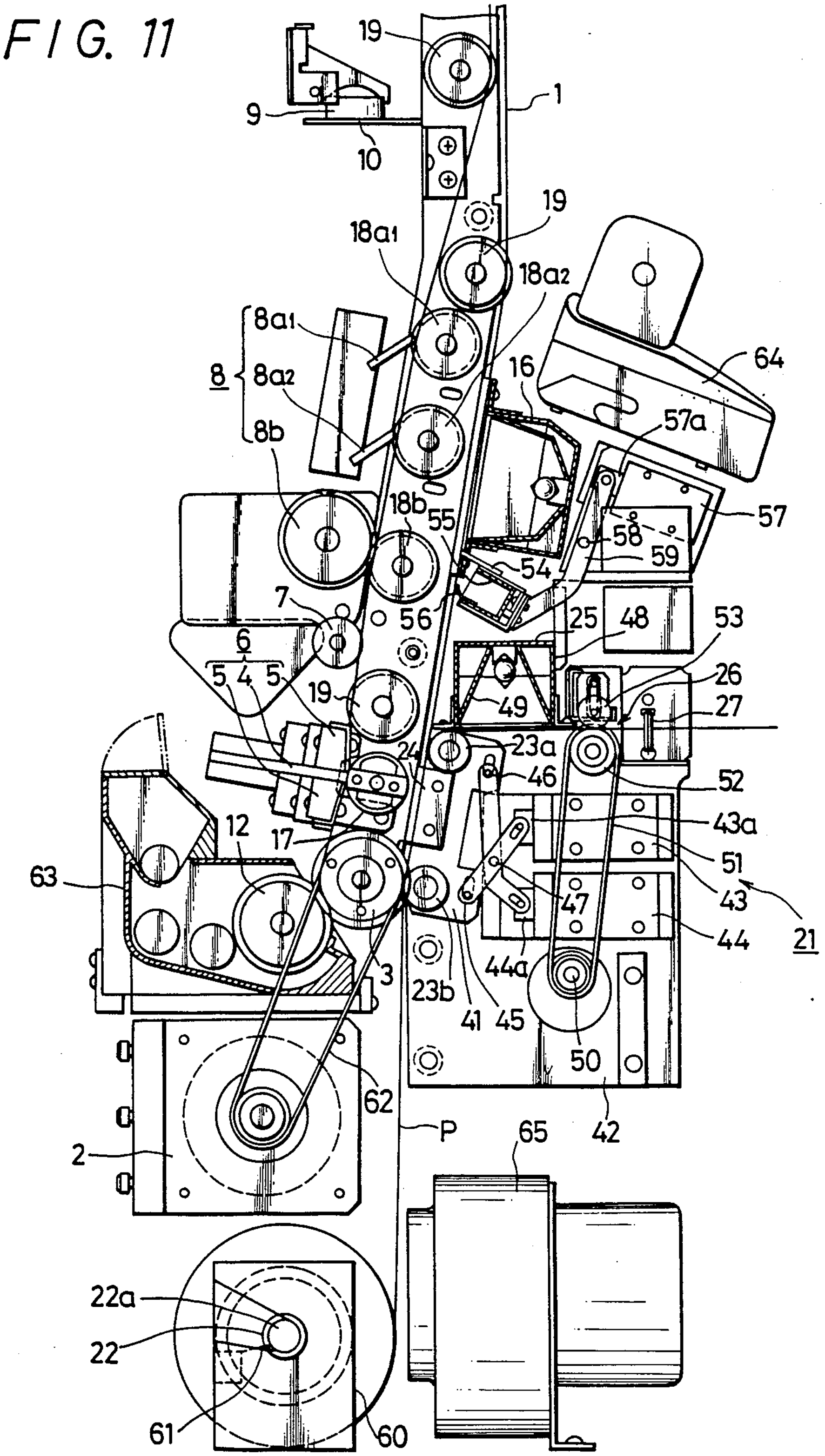
FIG. 11 is a side elevational view of a portion of the electronic blackboard of the present invention, illustrating the inside construction in detail.

FIG. 11 is a side view of an electronic blackboard according to the embodiment shown in FIG. 3, showing details of the transfer mechanism. Since other portions of this example are substantially the same as those described in relation to FIG. 3 and their operations have been described already, details thereof are omitted in the following description.

In FIG. 11, the pressure rollers 23*a* and 23*b* are rotatably supported in parallel with each other by a support frame 41 and are mutually separated by a predetermined distance. The support frame 41 is movably mounted on a base plate 42 provided in a lower front portion of the blackboard assembly. More specifically, gang pieces or arms 45 and 46 respectively couple the support frame 41 to movable iron cores 43*a* and 44*a* of a pair of solenoids 43 and 44 provided on the base plate 42, so that the support frame 41 is moved with respect to the blackboard when the solenoids 43 and 44 are actuated.

In order for the pressure roller 23*b* positioned upstream of the paper P to be pressed against the paper P earlier than the pressure roller 23*a*, the gang pieces 45 and 46 are crossed and pivotally supported at their middle portions by a support pin 47 fixed to the base plate 42, and the length of the gang piece 46 extending toward the pressure roller 23*a* from the support pin 47 is selected to be larger than that length of the gang piece 45. The transfer corotron 24 is mounted on the support frame 41 at an intermediate position between the pressure rollers 23*a* and 23*b*.

The fixing flash lamp 25, the feeding roller assembly 26, and the paper cutter 27 are respectively arranged downstream of the pressure roller 23*a*.

A Xenon flash lamp may be used for the fixing flash lamp 25, which is housed in a lamp house 48. In the lamp house 48, a reflection plate 49 is provided to reflect light from the lamp 25 to the copy paper to thereby quickly heat the copy paper and efficiently fix an image transferred to the paper P.

The feeding roller assembly 26 is composed of a feeding roller 52 driven by a motor 50 through a belt 51 and a pinch roller 53 resiliently urged against the feeding roller 52 by a spring, in order to transport the copy paper P fed therebetween. The paper cutter 27 disposed adjacent the feeding roller assembly 26 is automatically actuated to cut the paper P after a predetermined length of the paper P has been fed.

The transfer mechanism 21 thus constructed further includes a cleaning blade 54 which is provided upstream of the fixing flash lamp 16, which serves to fix the image on the recording medium 1. The cleaning blade 54 is mounted at the periphery of an opening of a toner receiving box 55, and a resilient receiving piece 56 is also mounted at the periphery of that opening opposite the cleaning blade 54. A base portion of the receiving box 55 is mounted on one end of an arm 59 that is rotatably supported at its middle portion on the base plate 42 by a support pin 58 the other end of the arm 59 being coupled to movable iron core 57*a* of a third solenoid 57, so that the arm 59 is rotated about the support pin 58 by action of the solenoid 57 and hence the cleaning blade 54 and the receiving piece 56 can be moved to make contact with or be separated from the surface of the electrostatic recording medium 1.

The bobbin 22 of the paper P is rotatably supported by a bracket 60 to which a pressure element 61 is mounted. The pressure element 61 is in resilient contact with a shaft 22*a* of the bobbin 22 in order to prevent over-spooling.

The motor 2 for driving the electrostatic recording medium 1 is a stepper motor coupled to the drive roller 3 through a belt 62. A toner supply box 63 is associated with the developer roller 12 to provide an adequate supply of toner.

The electronic blackboard assembly shown in FIG. 11 further includes a copy reading scanner 64 and a cooling blower 65.

Figure 12:
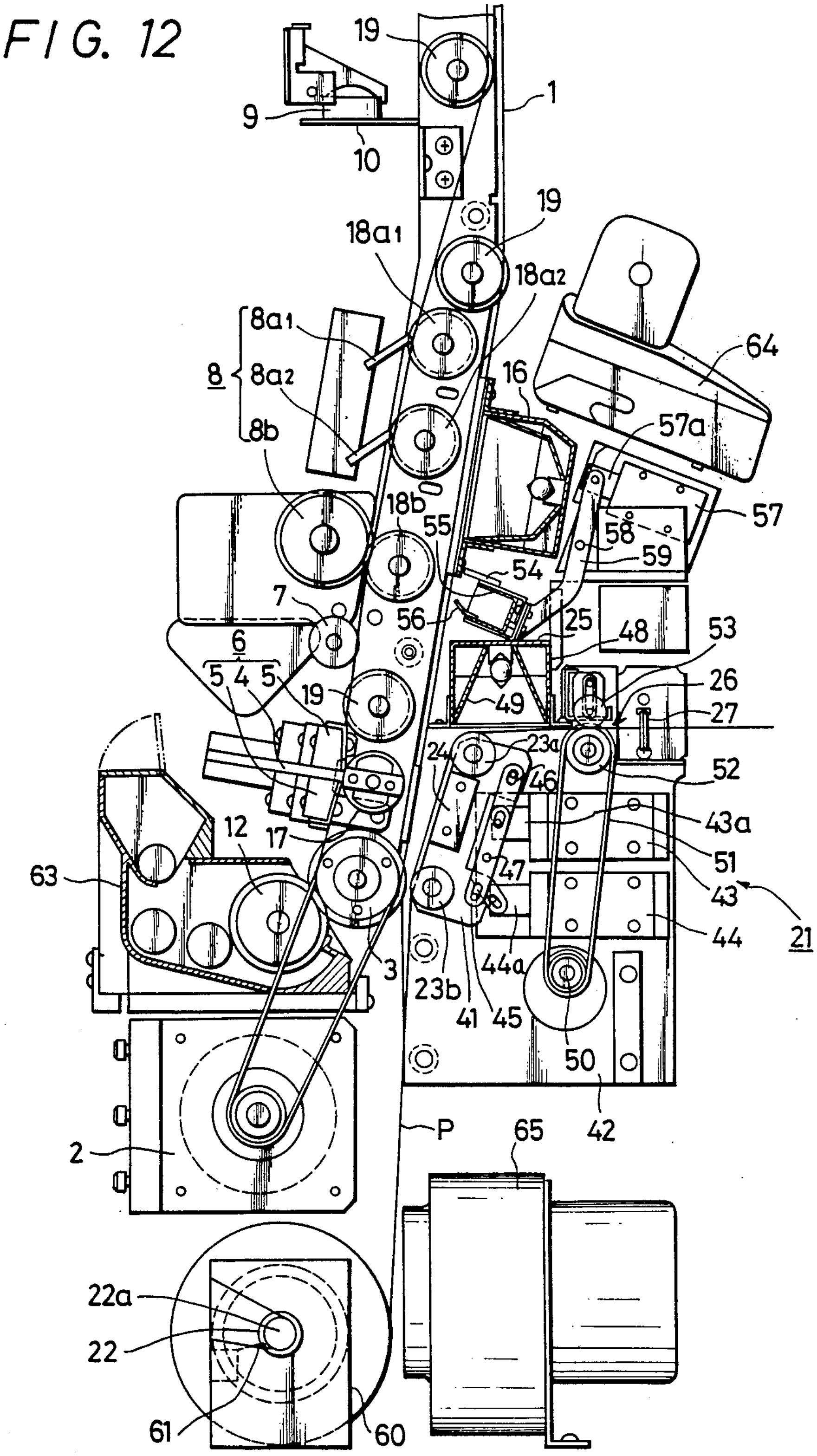
FIG. 12 is a side elevational view of the electronic blackboard as shown in FIG. 11 in a different stage of operation.

When the transfer mechanism 21 of the electronic blackboard constructed as mentioned hereinbefore is not in operation, the solenoids 43 and 44 are in an OFF position, as shown in FIG. 12, so that the movable iron cores 43*a* and 44*a* thereof are extended, and the gang pieces 45 and 46 respectively connected to the cores 43*a* and 44*a* are rotated around the pin 47 affixed to the support portion 42 in such a manner that gang piece 45 is rotated in the counterclockwise direction and gang piece 46 is rotated in the clockwise direction. The support frame 41 is thereby moved away from the recording medium 1 so that the pressure rollers 23*a* and 23*b* are separated from the recording medium 1.

When the third solenoid 57 is in an OFF position, the core 57*a* thereof extends and the arm 59 connected thereto is rotated about the pin 58 in a counterclockwise direction. The cleaning blade 54 and the receiving piece 56 mounted on the receiving box 55 are thereby moved away from the recording medium 1.

When the transfer mechanism 21 is not in operation, a normal latent image is recorded by the recording head 6 on the write surface of the electrostatic recording medium 1, and the toner supplied from the developer roller 12 adheres to the electrostatic latent image, thus a visible normal image is displayed. Under such condition, the toner image is semi-permanently fixed by heat from the fixing flash lamp 16 as the image portion of the recording medium 1 travels past the lamp 16, so that scattering of the toner is prevented.

Figure 13A:
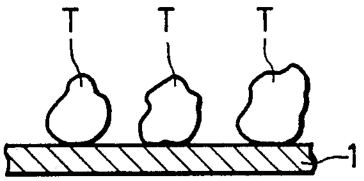
FIGS. 13A and 13B are enlarged pictorial representations of the electrostatic recording medium having toner adhered thereto.
Figure 13B:
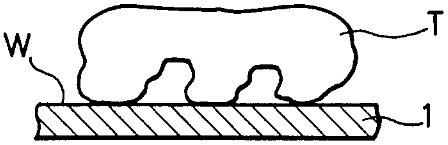

In the non-fixed state, as shown in FIG. 13A, the toner is simply residing on the surface of the recording medium 1, however, toner T is semi-permanently fixed onto the recording medium 1, as shown in FIG. 13B, by supplying energy to toner T, which energy may be about one third the energy necessary to permanently fix it. When toner T is of a styrene acryl system, for example, the semi-permanent fixing thereof can be achieved by supplying energy of about 0.5 to 0.7 Joule/cm. The transporting speed of the recording medium 1 and flashing interval of the flash lamp 16, and other parameters may be determined on the basis of this energy value.

In the present invention, a portion of the electrostatic recording medium 1 on which the electrostatic latent image is formed is transported to the developer roller 12, from which an amount of suitably colored toner adheres to the write surface W of the recording medium according to an amount of charge thereon. As a result, a visible image corresponding to the original copy information is written and displayed on the electrostatic recording medium 1. Since toner particles of this toner image are melted together around the outermost portions thereof by the Xenon lamp 16 so that the particles are semi-permanently fixed to the recording medium, as shown in FIG. 13B, scattering of toner and contamination of clothes by the toner is prevented. Since the portions of the toner particles adjacent to the write surface W are not melted together in this semi-permanent state shown in FIG. 13B, they can be easily scraped away by the cleaning blade and even by a hand scraper, resulting in facilitated erasure and/or amendment of the toner image.

In a case where the toner image on the recording medium 1 is to be transferred to standard paper, the transfer mechanism 21 is actuated to place the paper P in intimate contact with the electrostatic recording medium 1 by means of the pressure rollers 23*a* and 23*b*. More specifically, when the transfer mechanism 21 is actuated, the movable cores 43*a* and 44*a* of the solenoids 43 and 44 are retracted, rotating the gang pieces 45 and 46 in clockwise and counterclockwise directions, respectively, to thereby move the support frame 41, and hence the pressure rollers 23*a* and 23*b*, toward the recording medium 1 and press the paper P against the recording medium 1. Since gang piece 46 is longer than gang piece 45, the pressure roller 23*b*, which is upstream of the roller 23*a*, is brought into contact with the paper P before the roller 23*a* contacts the paper, thereby preventing paper P from warping in a region between these roller, so that the paper P can be in intimate contact with the recording medium 1 with a constant tension.

When the third solenoid 57 is actuated, the movable core 57*a* thereof is retracted so that the arm 59 is rotated in the clockwise direction to move the cleaning blade 54 and the receiving piece 56 on the receiving box 55 toward the recording medium 1 until the top ends of each are in contact with the recording medium.

The latent image is recorded on the recording medium 1 by the recording head 6 as a mirror image of the original copy. The mirror image is then developed by the toner supplied from the developer roller 12. This developed mirror image is transferred by the corotron 24 of the transfer mechanism 21 to the paper P while the portion of the paper which is in intimate contact with the recording medium 1 is moved together with the recording medium by the feeding member 26. The transferred image on the paper is a normal image of the copy and is permanently fixed thereon by heat from the fixing flash lamp 25.

The paper P having the normal image thereon is further transported by the feeding roller assembly 26 of the transfer mechanism 21, particularly, the feed roller 52 driven by the motor 50 and the pinch roller 53 and, after a predetermined length thereof is fed, the paper is cut by the paper cutter 27, resulting in a hard copy of, for example, A1 size.

There may be residual toner on the recording medium 1 even after the image thereon is transferred onto the paper P. Such residual toner is scraped off by the cleaning blade 54, which abuts the recording medium 1 and is disposed downstream of the location where the recording medium 1 is in pressure contact with the paper. Scraped off toner is received by the receiving piece 56 and dropped into the receiving box 55. Therefore, there is no scattering of toner from the box 55.

As described above, according to the present invention by which an image transfer function is added to an electronic blackboard already having a copy information display function, it becomes possible to transfer an image of a size corresponding to that of the original copy information, to store an image on a large size paper, to form a large size poster from an A4 size copy and/or to store a hard copy obtained by amending and/or correcting an image displayed on a display surface of the blackboard. Further, a number of large-sized copies can be obtained. These effects considerably expand the applicability of the electronic blackboard.

Having described preferred embodiments of the invention in detail with reference to the accompanying drawings, it is to be understood that the invention is not limited to those precise embodiments and that many changes and modifications could be effected by one with skill in the art without departing form the spirit and scope of the invention as defined in the appended claims.

What is claimed is:

1. An electronic image display apparatus, comprising:
- a frame means;
- sheet guides supported by said frame means;
- a continuous flexible sheet supported for movement by said sheet guides;
- a recording head arranged to contact a surface of said continuous flexible sheet for generating a static latent image on said flexible sheet in response to an image signal;
- developing means for generating a visible image on said flexible sheet by supplying toner to said latent image formed o said flexible sheet by said recording head; and
- fusing means for semi-permanently fusing to said flexible sheet said toner forming said visible image on said sheet.

2. A display apparatus according to claim 1, wherein said fusing means includes a flash lamp for providing a predetermined amount of energy in the form of heat to said latent image on said flexible sheet, where said predetermined amount of heat energy is approximately one third of the amount of heat energy necessary to permanently fuse said toner to said flexible sheet.

3. A display apparatus according to claim wherein said developing means includes a roller having toner thereon, and further comprising means for selectively causing said roller and said flexible sheet having said latent image thereon to make contact and to transfer said toner to said flexible sheet.

4. An electronic image display apparatus, comprising:
- a frame;
- sheet guides supported by said frame;
- a continuous flexible sheet supported for movement by said sheet guides;
- a recording head arranged to contact a surface of said flexible sheet for generating latent image on said continuous
- flexible sheet;
- signal processing means connected to said recording head to generate from image data fed thereto a normal image signal and a mirror image signal, each selectively supplied to said recording head;
- developing means for generating a visible image on said flexible sheet by supplying toner to said latent image formed on said flexible sheet by said recording head; and
- contact printing means for printing onto a paper said visible image formed by said toner on said flexible sheet, including means for causing said paper to directly contact said flexible sheet when said signal processing means supplies said mirror image signal to said recording head, thereby forming a normal toner image on said paper.

5. A display apparatus according claim 3, further comprising a first fusing means for semi-permanently fusing said toner onto said flexible sheet when said signal processing means supplies said normal image signal to said recording head.

6. A display apparatus according to claim 4, further comprising a second fusing means for fusing said toner onto said paper when said signal processing means supplies said mirror image signal, thereby fixing said toner image onto said paper.

7. A display apparatus according to claim 3, wherein said contact printing means includes rollers disposed to urge a portion of said paper against a portion of said flexible sheet having said visible image thereon, and a transfer corotron adjacent said portion of said paper for transferring said visible image from said flexible sheet onto said paper.

* * * * *

UNITED STATES PATENT AND TRADEMARK OFFICE

CERTIFICATE OF CORRECTION

PATENT NO. : 4,953,031

DATED : August 28, 1990

INVENTOR(S) : Naoya Katoh, et al.

It is certified that error appears in the above-identified patent and that said Letters Patent is hereby corrected as shown below:

Col. 2, line 10, change "I" to --1--

Col. 4, line 2, change "co responding" to --corresponding-- line 25, after "medium" insert --1--

Col. 7, line 5, after "medium" insert --1,--.

line 65, after "pin 58" insert --,--

Col. 8, line 54, change "cm" to --$cm^2$--

Col. 10, line 28, change "o" to --on-- line 40, after "claim" insert --1,-- line 54, "flexible sheet;" should be on line above after "continuous"

Signed and Sealed this

Twenty-seventh Day of April, 1993

*Attest:*

MICHAEL K. KIRK

*Attesting Officer*

*Acting Commissioner of Patents and Trademarks*